United States Patent [19]

King

[11] Patent Number: 5,244,623
[45] Date of Patent: Sep. 14, 1993

[54] METHOD FOR ISOSTATIC PRESSING OF FORMED POWDER, POROUS POWDER COMPACT, AND COMPOSITE INTERMEDIATES

[75] Inventor: Alan G. King, Twinsburg, Ohio

[73] Assignee: Ferro Corporation, Cleveland, Ohio

[21] Appl. No.: 698,569

[22] Filed: May 10, 1991

[51] Int. Cl.$^5$ ................... B29C 43/10; B29C 45/00; B05D 3/02
[52] U.S. Cl. ................... 264/510; 264/219; 264/317; 264/570; 419/42; 427/226; 427/299; 427/385.5; 427/430.1
[58] Field of Search ............... 264/51, 500, 510, 570, 264/125, 126, 219, 239, 297.8, 313, 317; 419/44, 49, 66, 68, 42; 427/226, 299, 372.2, 385.5, 430.1, 388.1, 389.7

[56] References Cited

U.S. PATENT DOCUMENTS

| | | | |
|---|---|---|---|
| 2,783,504 | 3/1957 | Hamjian et al. | 419/68 |
| 4,526,747 | 7/1985 | Schimmel et al. | 419/8 |
| 4,565,668 | 1/1986 | Aslund et al. | 419/68 |
| 4,612,163 | 9/1986 | Nishio et al. | 419/68 |
| 4,710,345 | 12/1987 | Doi et al. | 419/28 |
| 4,761,264 | 8/1988 | Nishio et al. | 419/68 |
| 4,778,650 | 10/1988 | Hermansson et al. | 419/49 |

FOREIGN PATENT DOCUMENTS

| | | |
|---|---|---|
| 145303 | 7/1985 | Japan . |
| 124565 | 6/1986 | Japan . |
| 103868 | 5/1988 | Japan . |

OTHER PUBLICATIONS

Wagner et al., "Hydrostatic Pressing as a Fabrication Technique", Am. Ceram. Soc. Bull. vol. 30, No. 10, pp. 341–344 (1951).
George D. Kelly, "Effects of Hydrostatic Forming," Am. Ceram. Soc. Bull., vol. 40, No. 6, pp. 378–382 (1961).
Wehrenberg et al., "Isostatic Pressing Large Refractory Blocks" Am. Ceram. Soc. Bull, vol. 47, No. 7, pp. 642–645 (1970).
Hart et al., "Mandrel and Bag for Isostatic Pressing of Closed End Tubes," Am. Ceram. Soc. Bull., vol. 49, No. 12, p. 1064 (1970).
Clark, "Rubber Molds for Wet Bag Isostatic Pressing", Am. Ceram. Soc. Bull., vol. 58, No. 6, p. 623 (1979).
McEntire., "Tooling Design for Wet-Bag Isostatic Pressing" vol. 9 of *Advances in Ceramics* Entitled Forming of Ceramics, Edited by Mangels, pp. 16–31 (American Ceramic Society, Inc.) 1984.
Lenoe, "Survey of Hot Isostatically Pressed Ceramics," OURFE Sci Info Bul, vol. 13, No. 2 (1988).

*Primary Examiner*—Jan H. Silbaugh
*Assistant Examiner*—Christopher A. Fiorilla
*Attorney, Agent, or Firm*—Renner, Otto, Boisselle & Sklar

[57] ABSTRACT

A method for isostatic pressing of formed powder, porous powder compact, and composite intermediates and the intermediate and final products produced thereby. The method includes the steps of:

(A) coating the exposed surface of the formed powder, porous powder compact, or composite intermediate with a flowable film-forming material capable of forming a solid continuous impervious flexible film; then (B) solidifying the coating of step (A) on the surface of the intermediate to form a coated intermediate; and (C) subjecting the coated intermediate of step (B) to a uniformly applied pressure exceeding atmospheric pressure to produce a flexible coating formed directly on the parts to be isopressed, permitting small parts or parts with complex shapes to be coated individually or in bulk.

19 Claims, No Drawings ered to isopress small parts or parts with complex shapes can now be achieved with the present invention.

METHOD FOR ISOSTATIC PRESSING OF FORMED POWDER, POROUS POWDER COMPACT, AND COMPOSITE INTERMEDIATES

TECHNICAL FIELD OF THE INVENTION

The invention described herein relates to the field of reduction of articles from formed powder, porous powder compact, and composite intermediates. In particular, the present invention relates to techniques for isostatic pressing of such intermediates prior to heating such intermediates to an elevated temperature to make the desired product.

BACKGROUND OF THE INVENTION

It is common practice to isopress (i.e., exert even pressure from all directions on) formed powders, powder compacts and composite intermediates prior to sintering (i.e., agglomeration by heating) to make high density ceramic, metal, and glass parts. Isopressing imparts a high uniform density throughout the part, which in turn assists the sintering process by allowing for a high and uniform sintered density at a lower sintering temperature. The result is a part having an improved microstructure, higher strength, and greater wear resistance.

There are several known isopress techniques. Two generally known isopress techniques include the "dry bag" and "wet bag" techniques. In the "dry bag" technique, a formed powder or porous powder compact is placed in the interior of an elastomeric bag or tube within the isostatic press. The elastomeric bag or tube is surrounded by a fluid which can be pressurized in order to compress the article placed therein. After compaction, the pressure is released and the treated part may be removed as a compressed intermediate for further processing.

In the "wet bag", the powder or pressed powder part is placed in an elastomer bag, sealed and placed in the isopress chamber. The chamber is then pressurized by pumping a liquid into the chamber. The pressure is uniformly applied to the bag, and the material within the bag, causing it to pack uniformly. Commonly used pressures range from about 34 MPa to 414 MPa.

A problem with the "wet bag" technique is that it is impractical to isopress small parts or parts with complex shapes. Small parts require a large number of elastomer bags in order to have productivity. Each of these bags would have to be individually handled. Complex parts require bags having complex shapes, which increases the expense and makes it difficult to insure that a complex shape will compact uniformly without cracking.

Another approach known as hot isostatic pressing (also known by the acronym "HIPing") incorporates forming and thermal treatment in one step. That approach has been used to obtain a dense ceramic from starting material that cannot be fully densified using conventional firing methods. However, it is usually limited to very simple shapes of a variety of materials and slow rates of production, and it is generally expensive.

The present invention solves these difficulties. In the present invention, a flexible coating is formed directly on the parts to be isopressed, permitting small parts or parts with complex shapes to be coated individually or in bulk. Higher production rates, reduced production cost, and the ability to produce complex and dense shapes from a variety of materials which could not previously be isopressed on a commercial scale can now be achieved with the present invention.

SUMMARY OF THE INVENTION

The present invention is a method for isostatic pressing of formed powder, porous powder compact, and composite intermediates and the products produced thereby. In particular, the method of the present invention comprises:

(A) coating the exposed surface of the formed powder, porous powder compact, or composite intermediate with a flowable film-forming material capable of forming a solid continuous impervious flexible film; then (B) solidifying the coating of step (A) on the surface of the intermediate to form a coated intermediate; and (C) subjecting the coated intermediate of step (B) to a uniformly applied pressure exceeding atmospheric pressure.

A detailed description of this invention follows.

DETAILED DESCRIPTION OF THE INVENTION

During isostatic pressing, formed powder, porous powder compact, and composite intermediates are compacted by the force exerted from outside the intermediate. This compaction is a direct result of consolidation or densification of the intermediate. The film-forming material of step (A) of the present invention must be capable of forming a continuous flexible film coating over the exposed surface of the intermediate which can be deformed without rupture during compaction of the intermediate while the intermediate undergoes isostatic pressing. In general, it is desirable that the coating be capable of at least 5% elongation, and more preferably at least 10% elongation, as measured, for example, by coating the material on crepe paper, drying, curing or cooling the coating material to form a flexible coating of a thickness similar to that which would be present in practice, and measuring the extent to which the crepe paper can be stretched without breaking the film.

It is also desirable that if the flexible coating formed by the film-forming material has a glass transition temperature, that the glass transition temperature be a temperature below the temperature at which isostatic pressing is conducted. If, for example, isostatic pressing is conducted at room temperature (i.e., 25° C.), it is desirable that the glass transition temperature be below room temperature. The inventor believes that the brittleness associated with the glass-like state below the glass transition temperature reduces the flexibility in the coating required by the present invention. The inventor, however, does not wish to be bound by any particular theory in how the present invention operates.

In one embodiment, the coating has no detectable glass transition temperature from about 20° C. up to the maximum temperature during isopressing.

Suitable film-forming materials include materials capable of forming elastomeric or flexible amorphous films such as polymers, polymerizable materials, and waxes, solutions of such materials and mixtures thereof. Examples include latex emulsions, silicone elastomers, solvent-based coatings, plastisols, polymer suspensions, amorphous thermoplastic polymers, and waxes. Latex emulsions and polymer suspensions are typically applied by dipping (typically straight dip or coagulant dip) or spraying. Amorphous thermoplastic polymers and waxes are typically applied by melting the polymer or wax onto the surface of the intermediate or dipping the intermediate into a melt. In terms of economy and ease of use, the latex emulsions such as natural rubber latex emulsions and polymers in solution such as "rubber cement" are often preferred.

The film-forming material can be solidified by any of the well known techniques known in the art, such as drying a solution comprising a volatile solvent and the film-forming material, curing a film-forming material comprising a polymerizable material, and cooling an intermediate on which the film-forming material had been melted.

In one type of embodiment, film-forming material is melted or made less viscous by heating and then is allowed to cool while in contact with the intermediate. In one approach, the intermediate may be dipped in a melt, allowed to drain in a heated atmosphere, and then permitted to cool with the coating solidifying on the surface. In another approach, the intermediate is coated with a meltable powder, such as by pretreating the intermediate with a tackifier or by heating the intermediate to a temperature sufficient to partially melt the meltable powder onto the surface of the intermediate to adhere the meltable powder to the intermediate, and then heating the meltable powder coated intermediate to a temperature sufficient to melt a continuous coating onto the surface of the intermediate.

Examples of preferred techniques with film-forming materials include dipping or spraying the intermediate in or with the materials capable of forming a flexible film. Among these, materials capable of forming elastomeric films are preferred.

Specific examples of suitable film-forming materials with plasticizers added when needed to achieve the desired flexibility and amorphous structure include acrylic ester resins such as ethyl acrylate, copolymers of methyl methacrylate with methyl and ethyl acrylate, acrylonitrile and/or styrene, copolymers of ethyl, butyl and methoxyethyl acrylates, ethylene-ethyl acrylate, blends of acrylic resins with vinyls, butadiene and/or other acrylic rubbers, etc.; rubber-modified nitrile resins such as butadiene nitrile resins, etc.; poly(1-butene/ethylene) copolymers; polyether glycols; ethylene vinyl acetate copoylmers; flexomers such as copolymers of ethylene with 1-butene, 1-hexene, and/or 1-octene; isobutylene-isoprene rubber (butyl rubber); natural rubber; polybutenes; neoprene; chlorosulfonated polyethylenes; polyethylene sulfides; ethylene-propylene rubber; thermoplastic elastomers such as olefinic, polyurethane, and silicone-modified styrenic copolymer thermoplastic elastomers; epoxy resins; phenolic resins; polyurethanes; silicone resins and elastomers; etc.; blends of these polymers and/or resins; solutions and emulsions of any of the foregoing resins and/or polymers in a suitable solvent or suspension system such as natural rubber solutions and natural rubber latex emulsions; polymerizable monomer and resin coating systems based on any of the foregoing materials and their precursors; vegetable waxes such as candilla, carnauba, etc.; mineral waxes; synthetic waxes such as polyethylene, Fischer-Tropsh, chemically-modified hydrocarbon, and substituted amide waxes; etc.; and blends of these waxes with each other and with the above polymers and resins.

The above materials are commercially available in the form of ready-to-use latex emulsions, plastisols, suspensions, and/or meltable or dissolvable powder form and are commercially available as chemical coating or dipping baths, paints, sealants, etc. The selection of a specific product for a particular end use application of the present invention is well within the purview of one of ordinary skill.

Typically, the uniformly applied pressure on the coated part comes from immersing the coated part in a liquid bath contained in a pressurizable container. When that is the case, the coating need only be liquid-impervious.

However, in another embodiment the pressure may be exerted by a gas. When a gas is used to exert pressure, the coating must be sufficiently impervious to the gas to prevent equalization of pressure between the exterior of the coating and any formed powder or porous powder compact part inside the coating. Equalization, of course, would defeat the purpose of pressurization which is to compress the part within the coating Therefore, the definition for the term "impervious" as used herein in connection with the flexible film varies depending upon the means used for applying uniform pressure to the coated intermediate.

Examples of materials which can be isopressed using this technique of the present invention include formed powder, porous powder compact or composite intermediates, including green ceramic pieces, powdered metal compacts, powdered polymer compacts, powdered glasses, composite structures, etc. For composites, the process can be used to advantage on whisker-reinforced ceramic matrix composites, particulate-reinforced ceramic composites, continuous filament polymer matrix composites, chopped fiber-reinforced polymer matrix composites, continuous filament-reinforced metal matrix composites, chopped fiber-reinforced metal matrix composites, particulate-reinforced metal matrix composites, laminated structures and other related materials.

When the components comprising the film-forming material are capable of invading, attacking or adhering to the intermediate, it is generally desirable to treat the intermediate with a surface sealant prior to treating the intermediate with the film-forming material. An indication that a surface sealant might be needed is when the film-forming material "wets" the surface of the intermediate or shows indications of being chemically reactive such as by discoloration of the intermediate, gaseous evolution, or strong adhesion. An example of when such pretreatment is desirable is, for example, when the intermediate is a formed powder or porous powder compact, such as a green ceramic piece, and the film-forming material is water-based, such as a water-based latex emulsion. Another example is when a metal powder compact is treated with a film-forming material capable of chemically attacking the metal, such as when a copper or aluminum powder compact is treated with a high pH film-forming material such as a latex emulsion.

Any of a variety of agents may be used to seal the surface such as polymers, waxes and, in the case of water-based film-forming materials, hydrophobic agents, provided that the dry surface sealant is substantially chemically inert with respect to the film-forming material and the intermediate. Preferably, the dry surface sealant is substantially non-adhesive with respect to the flexible coating. In general, the surface sealant should have a low viscosity, such as less than about 1.0 poise and more preferably less than about 0.1 poise, at the temperature of application to fill any voids near the surface with the surface sealing agent. Examples of preferred polymeric surface sealants include acrylic ester resins such as a 10% Acryloid B-67 TM (Rohm & Haas Company) in acetone; polyvinyl alcohol such as 3% Evanol 75-15 TM (DuPont) dissolved in water; cellulose acetate in a solvent; polystyrene, alkyd resin and polyester resin sealants and dilute paints; etc. One example of a hydrophobic agent is a silane.

Solvents used to apply the surface sealant are generally removed by evaporation, such as by applying heat, prior to treating the intermediate with the film-forming material. Room temperature air drying can also be used.

The isostatic pressing process can be conducted at a temperature within the range between the melting point of the isopressing fluid and (1) the decomposition temperature of the flexible coating, (2) the melting or sintering temperature of the intermediate, or (3) the boiling point of the isostatic pressing liquid (generally whichever is lowest). In general, the high end of the temperature range does not exceed about 1000° C. and typically does not exceed about 500° C. In one type of embodiment, the temperature does not exceed about 300° C. Within these temperature ranges, it may be desirable to carry out the process at an elevated temperature. An elevated temperature can be achieved with the selection of the appropriate film-forming material, intermediate and isostatic pressing liquid. Appropriate film-forming materials for elevated temperature isostatic pressing, such as silicone elastomers, may be selected which can withstand elevated temperatures as high as 300° C. or higher, in some cases as high as 500° C. and higher.

Elevated temperatures are useful for isostatic pressing of powdered polymer compacts, low melting (<1000° C., and more generally <500° C.) powdered metal compacts, polymer matrix composite structures and metal matrix composite structures in order to obtain a high density in the product obtained from the intermediate due to added heat-induced agglomeration. High fiber-to-resin ratios can be achieved at a high density in fiber-reinforced polymer composites made with this invention.

The uniformly applied pressure may be any pressure exceeding atmospheric which the part is capable of undergoing without causing unacceptable deformation or penetration of the coating. The pressure may be as low as 34 MPa or lower, and more generally at least about 300 MPa, up to about 600 MPa or higher, and more generally up to about 500 MPa. In general, soft metals and polymers do not require as high a pressure as ceramics and refractory metals.

As mentioned, the pressure is applied by a fluid, which may be a liquid or gas under process conditions. Liquid pressure is more typical in view of ease of operation of the production equipment, less danger of explosions from equipment failure, generally higher achievable pressures, and fewer problems with penetration of the fluid through the flexible coating The process of this invention can be mechanized and/or automated for large scale production of parts of complex shape and for the production of parts in bulk. Linear and point contact with other intermediates and with a device for holding one or more intermediates to be coated and isostatically pressed, such as a wire basket, a mesh net, or flow-through conveyer, does not interfere with the method of the present invention.

After isostatic pressing, the coating can be removed from the intermediate by chemical or mechanical peeling, chemical dissolution or destruction, or by heating the coated intermediate to a temperature sufficient to react the coating with a reactive atmosphere. In one embodiment, the coating is removed by burning off the coating in an oxygen-containing atmosphere.

The inventor has also discovered that the step of removing the parts from a basket or wire mesh container can be eliminated by the use of expendable mesh material to hold one or more intermediate parts. The intermediate parts can, for example, be placed in low cost mesh bags, processed according to the present invention, including isostatic pressing, and then eliminated by destroying the mesh bag. When, for example, the intermediates are sintered after isostatic pressing, the intermediates may be placed in low cost plastic mesh bags, optionally dipped in a surface sealant, dipped in a film-forming material and placed in an isostatic press after solidification of the coating on the intermediate. After isostatic pressing, the plastic mesh bag containing the consolidated and/or densified intermediate parts may be placed in a kiln and fired. The temperature in the kiln is elevated to one which is sufficient to destroy the plastic mesh bags and the coating material.

Typical plastic mesh bags include open mesh bags made of a polyolefin, such as the polyethylene mesh bags commercially available for packaging produce One important end use for the processes of the present invention is for manufacturing ceramic and ceramic composite parts. Starting materials include clay minerals, silica, feldspars, nonclay materials, super refractories, which include the carbides, borides, nitride, or silicides of elements such as silicon, boron, zirconium, hafnium, tantalum, vanadium, molybdenum, tungsten and niobium; nitrides; sulfides; single and complex oxides; nuclear ceramic materials, which include uranium oxide, uranium dioxide, uranium carbide, uranium nitrides, uranium sulfides, uranium phosphides, and combinations thereof; and electronic ceramic materials, which include ferrites with improved magnetic properties, titanates such as $BaTiO_3$; etc.

Another important application for the process of the present invention is the manufacture of metal, metal oxide, mixed oxide, and metal matrix composite parts. Examples of metals include aluminum, copper, iron alloys, magnesium, titanium, silver, nickel and zirconium, low melting metals such as indium and tin for the elevated temperature isopressing described above, and alloys of such metals with each other and/or other metals. Metal-matrix composites include, among others, those which have aluminum or magnesium matrices such as those made using boron or Borsic (borosilicon) SiC-coated boron fibers, spun silicon carbide fibers or silicon carbide whiskers in combination with aluminum or aluminum alloys. Other matrices include titanium and super alloy matrices. Super alloy matrices are useful for higher temperature end uses and generally comprise iron-, cobalt-, and nickel-based super alloys.

One aspect of this invention is to use the invention to manufacture physical forms comprising refractories including composite refractories and refractory coatings. Refractories are solid materials which are generally expected to withstand temperatures above 1100° C. without softening. Examples include single and mixed oxides of aluminum, calcium, chromium, magnesium, silicon, and zirconium such as alumina, stabilized zirconia, partially stabilized zirconia, mullite, magnesium aluminate spinel, etc.; carbon; graphite; silicon carbide;

etc.; combinations of carbon, graphite, silicon carbide, etc. with the aforementioned single and mixed refractory oxides, and composites with these materials.

Another important end use for the process of the present invention is the manufacture of polymer and polymer matrix parts. In one aspect of this invention, powdered polymers are formed into various shapes such as by forming a powder compact having the desired shape, alone or in combination with matrix-forming materials such as particles (a.k.a., fillers), whiskers and chopped fibers and/or long fibers, and then consolidated into a densified product of the same shape. Powdered polymers having thermoplastic characteristics can be formed into dense complex shapes having good mechanical properties. Typical high-temperature polymers commercially available as powders include Torlon TM (Amoco), PEEK TM (polyether-etherketone), Kerimid TM, Matrimid 5218 TM (Ciba-Geigy), LaRCTP1 (developed by NASA and commercially available from Rogers, Mitsui Toatsu and others), Ryton (Philips), Fortron (Celanese), PPS and Xydar LCP (Amoco). These and other similar polymers may be used, alone or in combination other types of polymer resins such as elastomeric resins, thermosetting resins, etc., either as a physical admixture of loose particles or in fused combination with the powdered polymer particles Likewise, the above-mentioned matrix-forming particles, whiskers, chopped fibers, and/or long fibers may be physically admixed with the powdered polymer or may be fused with the powdered polymer particles, such as by adhesion or by incorporating the matrix-forming materials into the polymer prior to converting the polymer into a powdered form.

The polymer products produced by this process include those which are laminated and those which are reinforced with particles, whiskers or fibers.

In one embodiment, the process of the present invention is used to consolidate composite prepregs to make a composite material having the desired reinforcing material content. Composite prepregs usually comprise a high-temperature matrix-resin system combined with an inorganic reinforcing phase. High-temperature matrix-resin systems include the above-mentioned thermoplastic resins such as Torlon TM (Amoco), etc., and/or thermosetting resins such as PPQ 401 TM (Whittaker), Kapton TM (DuPont), Skybond TM (Monsanto), P13N TM (TRW), Kerimid-Kinel TM (Rhodia), etc. These can be used to bond any inorganic reinforcing phase including carbon fibers, glass fibers, etc. Such a process generally involves the following steps:

(1) Sheets of a prepreg (fiber and resin combined to form tape) are stacked up on a form which has the desired shape. The form is coated with a release agent;

(2) Sheets of a permeable fabric called bleeder sheets are laid over the prepreg;

(3) The prepreg is encapsulated with a film-forming material capable of withstanding the elevated processing temperature in step (4) below, the encapsulation conducted according to the process of the present invention;

(4) The entire encapsulated assembly, including the form, is placed in an autoclave and heated under pressure to soften the resin and squeeze out air and excess resin polymer into the bleeder sheets; and (5a) If the prepreg can be thermoset, the final step is curing the product of (4) by cross-linking or (5b) If the prepreg is not thermoset, but a thermoplastic matrix, the final step is solidification by cooling the product of (4) under pressure.

The table which follows illustrates some typical processing differences between the thermoset and thermoplastic polymer matrix materials.

| Characteristic | Thermosets | Thermoplastics |
| --- | --- | --- |
| Temperature | 180–200° C. | 300–325° C. |
| Pressure | .52–1.03 MPa | 1.03–2.07 MPa |
| Polymers | Epoxy | PEEK (polyether-ether ketone) |
|  | Polyimides | Polyamide-imide |
|  | Phenolics | Polysulfones |

In this aspect of the present invention, the pressure can be increased up to 500 Mpa, resulting in composites with higher densities and higher fiber loading, or fiber loading within a narrower desired range. Industrial products which may be manufactured with the aid of the process of the present invention include those which require the ability to withstand mechanical and heat-induced stress such as crucibles, cutting tools, wear parts, mill jars, milling media, ferrules, thread guides, nozzles, gears, sprockets, pump impellers, slides, sleeves, rollers, rings, pins, connecting rods, tubes, seals, die punches, die liners, armor, blades, panels, braces, brackets, stators, tile, gun liners, finned heat exchanger tubes, components for turbine engines, components for piston engines, and aerospace structures. Turbine engine components include turbine blades, vanes, nozzle liners, etc., and piston engine components include piston caps, flanged sleeves, engine valves, turbocharger rotors, etc.

Other industrial products which may be produced with the process of the present invention are those which require consolidation of complex materials such as electronic components. Electronic components include capacitors, transducers, multi-layer capacitors, multi-layer integrated circuit packages, ceramics having magnetic properties such as read/write heads for recording information on magnetic media, and ceramics having electrical and ionic conductivity.

An important advantage obtained with the process of the present invention is the ability to consolidate or densify parts having a complex shape. With reference to this technology, the inventors define the expression "complex shape" as a shape which is difficult to form into a homogenous dense compact. This includes shapes which have the following attributes: Variable thickness, more than one outside diameter and/or inside diameter, combinations of different types of surfaces including planar, cylindrical, spherical, paraboloid, hyperboloid, and conical. Many of the industrial products listed above fall within this definition. Specific examples include boxes, knives, an angular block, a turbocharger rotor, a piston cap, flanged sleeves, engine valves, pump impellers, gears, sprockets, and finned heat exchanger tubes.

The examples which follow illustrate the process of the present invention. They are not to be construed as limiting upon the scope of the present invention. Unless otherwise stated, all parts, percentages and ratios and the like are by weight, temperature is 25° C. and the pressure is one atmosphere.

EXAMPLE 1

A plastic mesh bag made from a spool of plastic mesh available from General Bag Corporation (Cleveland, Ohio) is filled with one-quarter inch diameter green Arlcite ® satellite spheres (high aluminum fabrications made of 85% alpha-alumina, and a substantial remainder glass, for making grinding media and parts for wear resistant applications commercially available from Ferro Corporation). The filled bag is about two inches in diameter, six inches long and tied at both ends. The bag is dipped twice in an acetone solution containing 10% by weight Acryloid B-67 TM with drying at 70° C. (until no acetone odor is detected) after each dip. The bag containing the treated spheres is then dipped twice in a natural rubber latex emulsion made from 60 CX 3044 ® available from Chemionics Corporation (Tallmadge, Ohio) diluted with deionized water adjusted to pH 10.3 with ammonium hydroxide to reduce the viscosity from 0.37 poise to 0.064 poise (about 1 part pH adjusted deionized water to 2 parts 60 CX 3044 ® latex emulsion) with drying in air at 70° C. after each dip. The bag is iso-pressed at 441 MPa and bisque fired at 1000° C. for one hour. After allowing the spheres to cool, the spheres are examined for isopress shrinkage, contamination and breakage. The results are summarized in Table 1 following Example 2.

EXAMPLE 2

The procedure of Example 1 is followed, except that the bag containing spheres treated with the Acryloid B-67 TM is dipped twice in a latex emulsion which is undiluted 60 CX 3044 ® latex emulsion rather than the diluted latex emulsion of Example The drying steps are the same. After allowing the spheres to cool they are examined for isopress shrinkage, contamination and breakage, and the results are summarized in Table 1 below.

TABLE 1

ISOPRESS SHRINKAGE, CONTAMINATION AND BREAKAGE OF ONE-QUARTER INCH ARLCITE ® SATELLITE SPHERES PREPARED ACCORDING TO EXAMPLES 1 AND 2

| Characteristic | Example 1 | Example 2 |
| --- | --- | --- |
| Diameter shrinkage | 3.85% | 3.76% |
| Vol. change assuming spherical shape | 11% | 11% |
| Contamination | None (Fired white) | None (Fired white) |
| Breakage | 0% | 1.95% |

The results in Table 1 show that quarter inch Arlcite ® satellite spheres can be isopressed for making small dense sintered products in bulk with no contamination and a low rejection rate due to breakage. The spheres dipped in the low viscosity latex emulsion of Example 1 have a zero breakage rate with less film-forming material than the Example 2 product made using undiluted latex emulsion. The plastic mesh bags do not interfere with the process.

EXAMPLE 3

A slip cast crucible two and one-quarter inch in diameter by about one and three-quarter inches high made from a 99.9% pure alpha-alumina powder having a mean particle size of 2.79 microns is coated to seal the surface by dipping the crucible in a 10% Acryloid B-67 TM in acetone solution followed by drying at 60° C. repeated four times The crucible is then coated with latex by dipping the surface sealed crucible in a Chemionics 60 CX 3044 ® latex emulsion twice, each dip followed by curing the latex emulsion at 60° C. The coated crucible is pressed in an isostatic press at 318 MPa. The crucible is then sintered at 1525° C. for two hours. The resulting product was white-opaque in appearance and had a specific gravity of 3.86 grams per cubic centimeter (96.7% of theoretical).

A similar crucible fired at the same time-versus-temperature schedule, but without isostatic pressing, achieved a specific gravity which was only 88% of theoretical.

EXAMPLE 4

Using the same unfired crucible used in Example 3, the crucible is coated with rubber cement by brushing Carter's Rubber Cement ® (Dennison Carter Division, Dennison Manufacturing Company, Framingham, Mass.) onto all surfaces. After drying, the crucible is pressed in an isostatic press at 345 MPa and sintered at 1550° C. for two hours. The crucible had no visible flaws and had a specific gravity of 3.954 grams per cubic centimeter (99.2% theoretical).

EXAMPLE 5

Copper powder obtained from Grezes Inc. is pressed in a 1.914 cm inside diameter die with 154 MPa. The copper powder compact is surface sealed by dipping the compact into an acetone solution containing 10% Acryloid B-67 TM twice with drying between each dip until no acetone odor is detected. After drying, the disc is coated with Chemionics 60 CX 3044 ® latex emulsion twice with drying at 55° C. after each dip. The coated disc is isopressed at 345 MPa with a 60 second hold at pressure. The isopressed disc after removal of the latex coating has a specific gravity of 7.01 grams per cubic centimeter (78% theoretical).

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method for isostatic pressing of formed powder, porous powder compacts, and composite intermediate articles comprising:
   (A) coating the exposed surface of a formed powder, porous powder compact, or composite intermediate article with a flowable film-forming material capable of forming a solid continuous fluid-impervious flexible film; then
   (B) solidifying the coating of step (A) on the surface of the formed powder, porous powder compact, or composite intermediate article to form a coated intermediate; and
   (C) subjecting the coated intermediate of step (B) to a uniformly applied pressure exceeding atmospheric pressure at a temperature not exceeding about 500° C. wherein the film-forming material of step (A) comprises a polymerizable material, and step (B) comprises curing the coating of step (A).

2. The method of claim 1 wherein the polymerizable material comprises a latex emulsion and the temperature of step (C) does not exceed about 300° C.

3. The method of claim 1 wherein the film-forming material has a viscosity of not more than about 0.2 poise at the temperature at which step (A) is conducted.

4. The method of claim 1 wherein the formed powder, powder compact, or composite intermediate article is a powdered polymer compact and step (C) is carried out at an elevated temperature.

5. The method of claim 1 wherein the formed powder, powder compact, or composite intermediate article is a prepreg resin and step (C) includes raising the temperature to a temperature sufficient to soften the prepreg resin to a flowable state.

6. The method of claim 1 wherein the coating of step (B) is capable of being removed by thermal decomposition at an elevated temperature and the process further comprises:

(D) heating the coated intermediate of step (C) at a temperature sufficient to decompose the coating.

7. The method of claim 1 wherein the formed powder, powder compact, or composite intermediate article is enclosed in a mesh bag prior to step (A) and steps (A), (B) and (C) are conducted while the formed powder, powder compact, or composite intermediate article is in the mesh bag.

8. The method of claim 7 wherein the coating and mesh bag of steps (A), (B) and (C) are capable of being removed by thermal decomposition at an elevated temperature and the process further comprises:

(D) heating the coated intermediate of step (C) at a temperature sufficient to decompose the coating and mesh bag.

9. The method of claim 8 wherein the material of the formed powder, powder compact, or composite intermediate article of step (A) is selected from the group consisting of a green ceramic, powdered metal, powdered metal oxide, powdered glass, ceramic composite, and metal matrix composite intermediate.

10. The method of claim 1 wherein coating step (A) is conducted by immersing the formed powder, porous powder compact, or composite intermediate in a bath comprising the film-forming material and removing the formed powder, porous powder compact, or composite intermediate from the bath prior to step (B).

11. A method for isostatic pressing of formed powder, porous powder compacts or composite intermediate articles comprising:

(A1) treating the exposed surface of a formed powder, a porous powder compact, or a composite intermediate article with a surface sealant; then (A2) coating the treated surface of the product of step (A1) with a flowable film-forming material capable of forming a solid continuous liquid-impervious flexible film; then (B) solidifying the coating of step (A2) on the treated surface of the intermediate to form a coated intermediate; and (C) subjecting the coated intermediate of step (B) to a uniformly applied pressure exceeding atmospheric pressure at a temperature not exceeding about 1000° C., wherein the surface sealant of step (A1) is selected from the group consisting of a polymer, a wax and a hydrophobic agent.

12. The method of claim 11 wherein the surface sealant of step (A1) is a polymer selected from the group consisting of polyvinyl alcohol, polyacrylate, and a polysilane.

13. The method of claim 11 wherein the film-forming material of step (A2) is a polymer or a polymerizable material and the temperature of (C) does not exceed about 500° C.

14. The method of claim 11 wherein the film-forming material of step (A2) comprises a latex emulsion and the temperature of (C) does not exceed about 300° C.

15. The method of claim 14 wherein step (B) comprises cuing the latex emulsion at a temperature of at least about 50° c.

16. A method for bulk isostatic pressing of formed powder, porous powder compact, and composite intermediate articles comprising:

(A1) immersing two or more intermediate articles into a bath containing a flowable film-forming material capable of forming a solid continuous fluid-impervious flexible film coating until the entire surface of all intermediate articles are contacted with the film-forming material and (A2) removing the immersed intermediate articles from the bath of step (A1); then (B) solidifying the film-forming material on the surface of the immersed intermediate articles from step (A2) to form coated intermediate articles; and (C) subjecting the coated intermediate article of step (B) to a uniformly applied pressure exceeding atmospheric pressure such that two or more intermediate articles are simultaneously subjected to the uniformly applied pressure.

17. The method of claim 16, wherein two or more intermediate articles are contained in a flow-through mesh container.

18. The method of claim 17 wherein the mesh container is a plastic mesh bag and (A1) is conducted at a temperature not exceeding about 500° C.

19. The method of claim 17 wherein the intermediate articles are moved on a flow-through mesh conveyor from step (A1) to step (A2).

* * * * *